US005969249A

United States Patent [19]

Roessig et al.

[11] Patent Number: 5,969,249

[45] Date of Patent: Oct. 19, 1999

[54] RESONANT ACCELEROMETER WITH FLEXURAL LEVER LEVERAGE SYSTEM

[75] Inventors: Trey Roessig, Albany; Roger T. Howe, Lafayette; Albert P. Pisano, Livermore, all of Calif.

[73] Assignee: The Regents of the University of California, Oakland, Calif.

[21] Appl. No.: 09/073,747

[22] Filed: May 6, 1998

Related U.S. Application Data

[60] Provisional application No. 60/045,812, May 7, 1997.

[51] Int. Cl.[6] .................................................. G01P 15/09

[52] U.S. Cl. .................................. 73/514.15; 73/514.29; 73/514.36

[58] Field of Search ............................ 73/514.15, 514.16, 73/514.22, 514.29, 504.16, 514.36; 310/338, 370; 331/65

[56] References Cited

U.S. PATENT DOCUMENTS

| | | | |
|---|---|---|---|
| 4,930,351 | 6/1990 | Macy et al. | 73/504.16 |
| 5,265,473 | 11/1993 | Funabashi | 73/514.15 |
| 5,396,144 | 3/1995 | Gupta et al. | 73/504.16 |
| 5,408,119 | 4/1995 | Greiff | 73/514.15 |
| 5,792,953 | 8/1998 | Kaneko et al. | 73/514.15 |

*Primary Examiner*—Hezron Williams
*Assistant Examiner*—Helen C. Kwok
*Attorney, Agent, or Firm*—William S. Galliani; Pennie & Edmonds LLP

[57] ABSTRACT

An accelerometer comprises a proof mass, a first resonant tuning fork connected to the proof mass, a second resonant tuning fork connected to the proof mass, and a flexural lever leverage system supporting the proof mass above a substrate. The flexural lever leverage system enhances an acceleration force applied to the proof mass to cause a tensile force in the first resonant tuning fork which raises its resonant frequency, and a compressive force in the second resonant tuning fork which lowers its resonant frequency. The device may be fabricated using semiconductor-based surface-micromachining technology.

11 Claims, 8 Drawing Sheets

RESONANT ACCELEROMETER WITH FLEXURAL LEVER LEVERAGE SYSTEM

This application claims priority to the provisional patent application entitled "Resonant Accelerometer with Flexural Lever Levarage System", filed May 7, 1997, Serial No. 60/045,812.

This invention was made with Government support under Grant (Contract) No. DABT63-93-C-0065 awarded by ARPA. The Government has certain rights to this invention.

BRIEF DESCRIPTION OF THE INVENTION

This invention relates generally to accelerometers. More particularly, this invention relates to a resonant accelerometer utilizing a flexural lever leverage system for enhanced acceleration force amplification.

BACKGROUND OF THE INVENTION

A resonant accelerometer is a sensor that responds to an acceleration force by producing a frequency shifted output signal. Quartz-based resonant accelerometers have been used in many commercial applications, including navigation-grade precision accelerometers.

Micromachined resonant sensors have been developed. The acceleration force amplification provided by these early devices has been limited by the leverage systems for the proof masses of the devices. Thus, to improve the response of micromachined resonant sensors, it is important to improve upon prior art proof mass leverage systems.

Some recent work has focused on micromachined resonant sensors in bulk silicon processes, but this class of sensor has not yet been pursued in a surface-micromachining technology. Surface-micromachining technology embeds a micromechanical device in an anisotropically etched trench below the surface of a wafer. Prior to microelectronic device fabrication, this trench is refilled with oxide, chemical-mechanically polished, and sealed with a nitride cap in order to embed the micromechanical devices below the surface of the planarized wafer. The wafer is then used as the starting material for integrated circuit fabrication in a conventional process, such as CMOS or BiCMOS. Thus, surface-micromachining technology allows a micromachined device to be combined with integrated circuitry in a single wafer.

In view of the foregoing, it would be highly desirable to provide a resonant accelerometer with an improved leverage system for enhanced force amplification. In addition, it would be highly desirable to provide a resonant accelerometer design that is compatible with surface-micromachining technologies.

SUMMARY OF THE INVENTION

An accelerometer comprises a proof mass, a first resonant tuning fork connected to the proof mass, a second resonant tuning fork connected to the proof mass, and a leverage system supporting the proof mass above a substrate. The leverage system enhances an acceleration force applied to the proof mass to cause a tensile force in the first resonant tuning fork which raises its resonant frequency, and a compressive force in the second resonant tuning fork which lowers its resonant frequency. The device may be fabricated using semiconductor-based surface-micromachining technology.

The flexural lever pivot and lever arm configuration of the leverage system provides enhanced force amplification.

Thus, the resonant accelerometer of the invention provides more accurate output. While the invention exploits the benefits of surface-micromachining technologies, the structure of the invention can also be constructed using laminar technology, such as single-crystal silicon, epi-polysilicon, silicon-on-glass, plated metal, or quartz.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
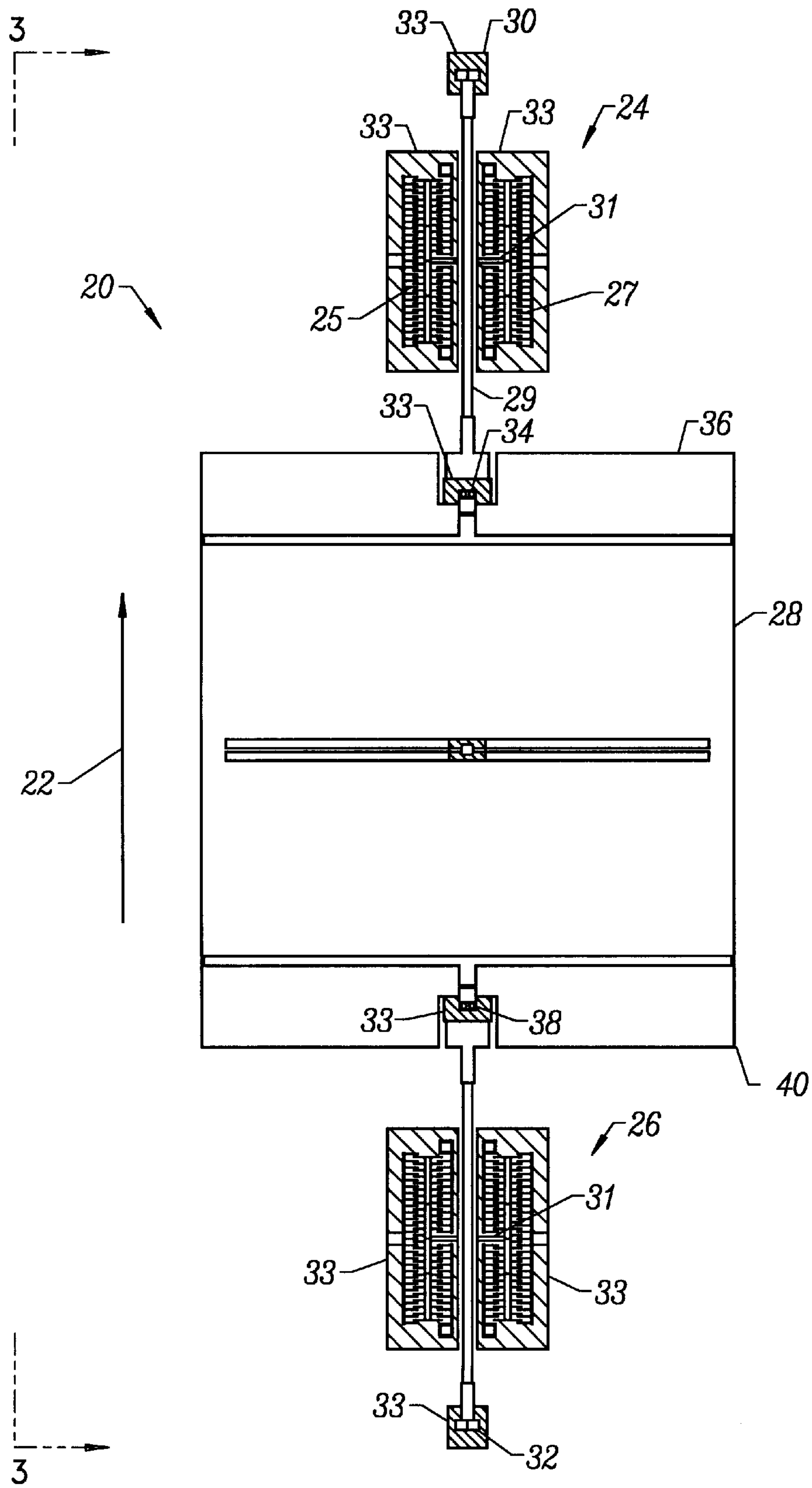
FIG. 1 is a plan view of a flexural lever resonant accelerometer in accordance with an embodiment of the invention.

FIG. 1 illustrates a flexural lever resonant accelerometer 20 in accordance with an embodiment of the invention. The accelerometer 20 responds to acceleration along its sensitive axis 22. The accelerometer 20 has a double ended tuning fork including a first tuning fork 24 and a second tuning fork 26. The first tuning fork 24 has a first fork anchor 30, while the second tuning fork 26 has a second fork anchor 32.

Figure 2:
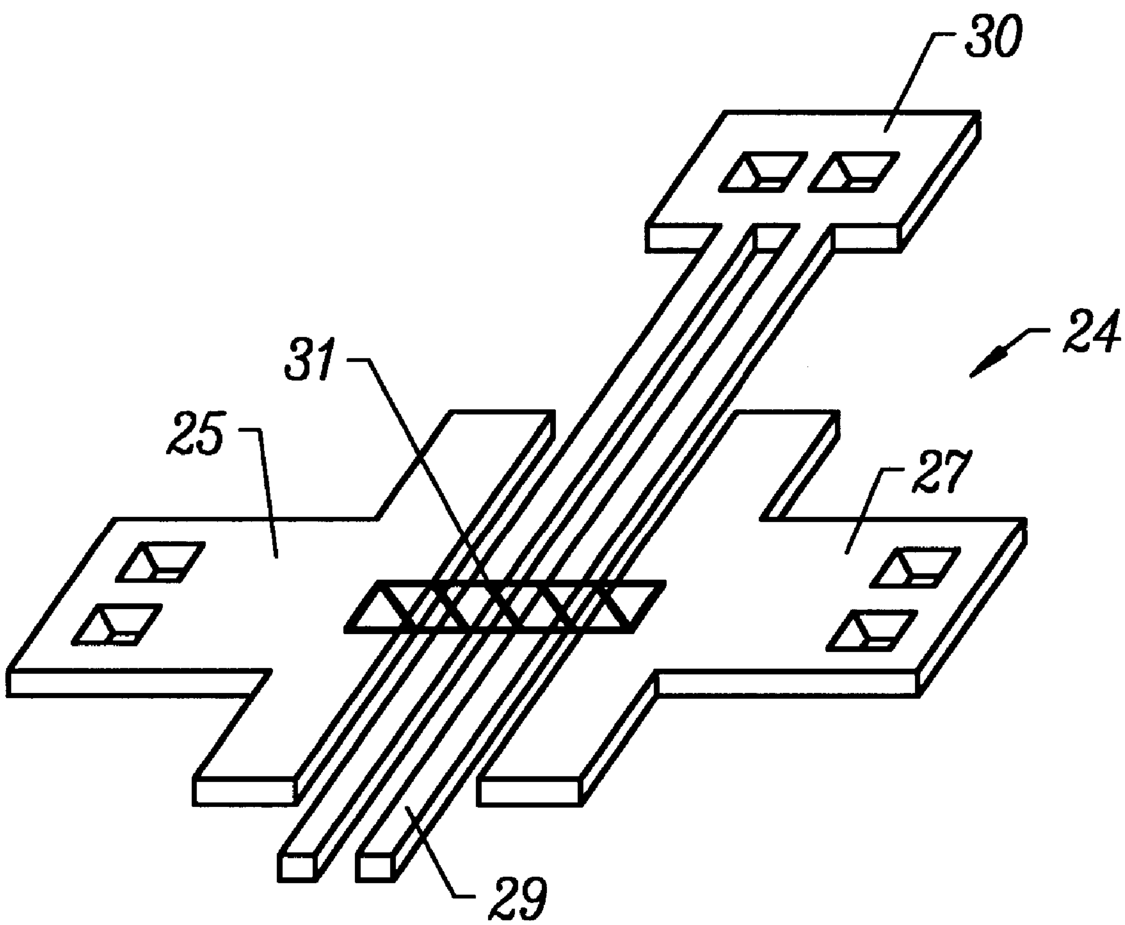
FIG. 2 is a perspective view of a tuning fork constructed in accordance with an embodiment of the invention.

FIG. 2 is a perspective view of the first tuning fork 24. The figure illustrates the first fork anchor 30. The figure also illustrates a drive electrode 25 and a sense electrode 27 associated with the fork 24. The fork 24 also includes one or more tines 29. A drive device 31 is typically attached to the tines 29, the drive electrode 25, and the sense electrode 27 to force the tines 29 into resonance. Alternately, electrostatic forces may be used to drive the tines 29 into resonance.

Returning to FIG. 1, in accordance with the invention, the drive electrode 25, the sense electrode 27, and the first fork anchor 30 are connected to a substrate 33. Fork tines 29 are suspended above the substrate 33. A similar configuration exists for the second tuning fork 26.

A proof mass 28 is also suspended above the substrate 33. In particular, a leverage system including a first flexural lever pivot 34 is used to support the proof mass 28. The lever pivot 34 may be in the form of a post or similar structure within the substrate 33. A first lever arm 36 pivots about the first flexural lever pivot 34. The lever arm 36 is attached to the proof mass 28. Similarly, a second lever arm 40 pivots about a second flexural lever pivot 38 associated with the substrate 33. In sum, the substrate 33 supports the first fork anchor 30, the second fork anchor 32, the drive and sense electrodes 25, 27 associated with each fork 24, 26, the first flexural lever pivot 34, and the second flexural lever pivot 38. The fork tines 29, the first lever arm 36, the second lever arm 40, and the proof mass 28 are suspended above the substrate 33.

Figure 3:
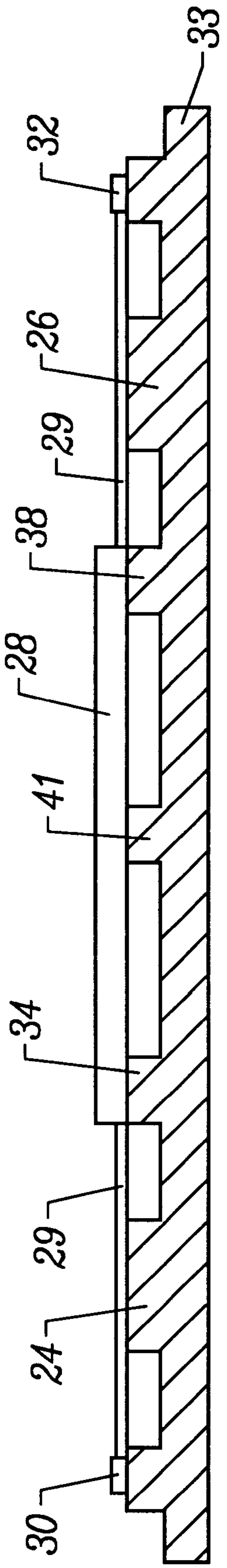
FIG. 3 is a cross-section view of the device of FIG. 1.

This configuration is more fully appreciated with reference to FIG. 3. FIG. 3 is a cross-sectional view taken along the line 3—3 of FIG. 1. The figure illustrates a substrate 33, which is used to support the first fork anchor 30 and the second fork anchor 32. The substrate 33 is also used to support the first tuning fork 24 and the second tuning fork 26. More particularly, the substrate 33 supports the drive and sense electrodes associated with each fork. The tines 29 pass through channels (not shown) etched in the substrate 33. FIG. 3 also illustrates the first flexural lever pivot 34 and the second flexural lever pivot 38 formed in the substrate 33. Finally, FIG. 3 illustrates an optional central support pillar 41 for the proof mass 28.

Figure 5:
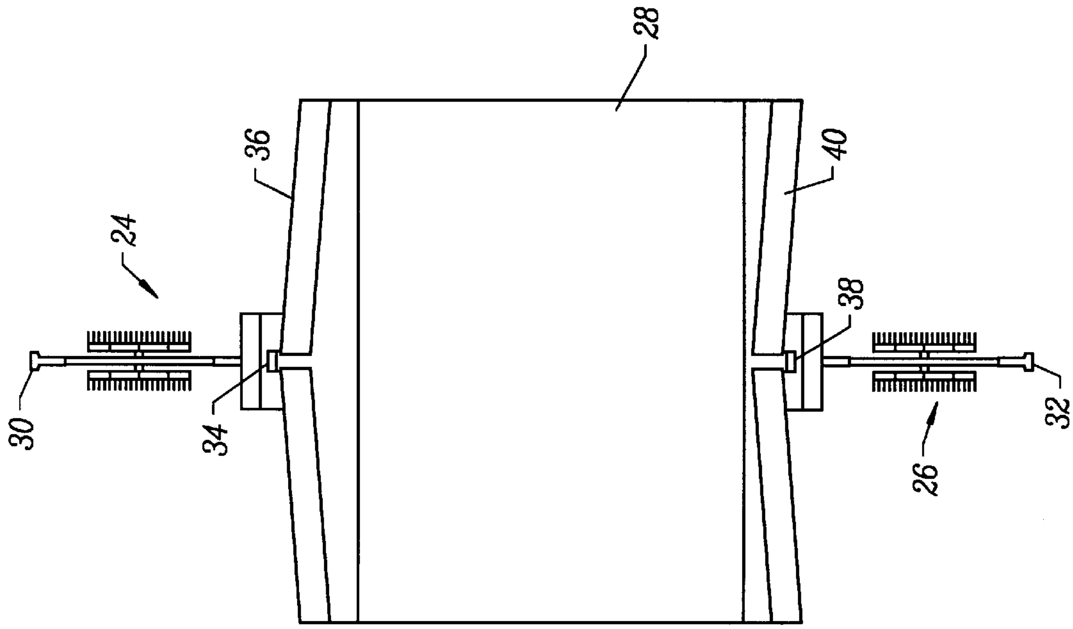
FIG. 5 is a plan view of the flexural lever resonant accelerometer of FIG. 4 in a flexed posture.
Figure 4:
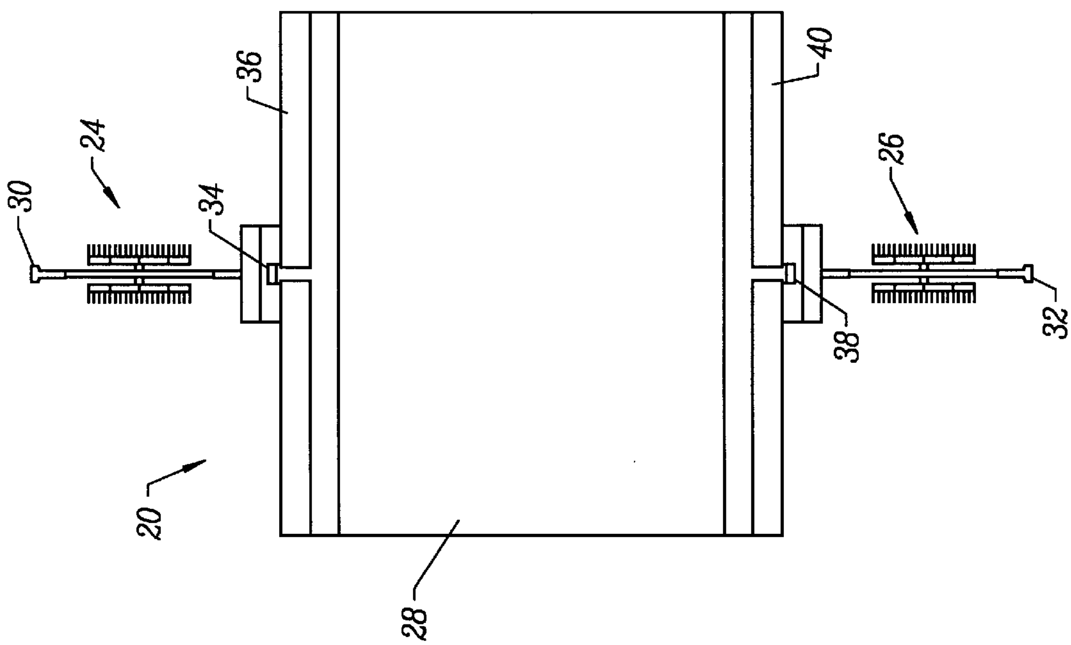
FIG. 4 is a plan view of a flexural lever resonant accelerometer in accordance with another embodiment of the invention.

The pivoting of the lever arms about the flexural lever pivots is more fully appreciated with reference to FIGS. 4 and 5. FIG. 4 illustrates a flexural lever resonant accelerometer 20 of the type shown in FIG. 1. However, the device of FIG. 4 has a first lever arm 36 and a second lever arm 40 of a slightly different configuration than the corresponding elements shown in FIG. 1. Those skilled in the art will recognize other lever arm and flexural lever pivot configurations that may be used in accordance with the teachings of the invention.

FIG. 4 illustrates the flexural lever resonant accelerometer 20 in a resting position (no acceleration force applied). FIG. 5 illustrates the flexural lever resonant accelerometer 20 in a flexed position as a result of an applied acceleration force. In FIG. 5, the first lever arm 36 is pushed away from the proof mass 28. This causes the first fork 24 to be extended, resulting in an increased output signal frequency. Simultaneously, the second lever arm 40 is pushed toward the proof mass 28. This causes the second fork 26 to be compressed, resulting in a decreased output signal frequency. This phenomenon is more fully appreciated with respect to FIGS. 6–8.

Figure 6:
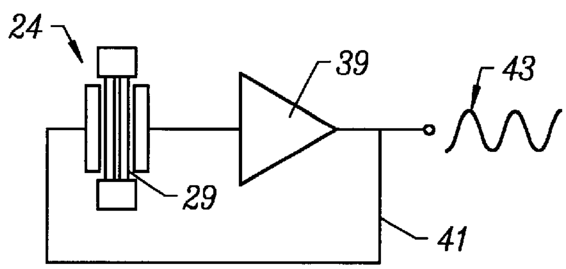
FIG. 6 illustrates a tuning fork and oscillation loop utilized in accordance with an embodiment of the invention.
Figure 7:
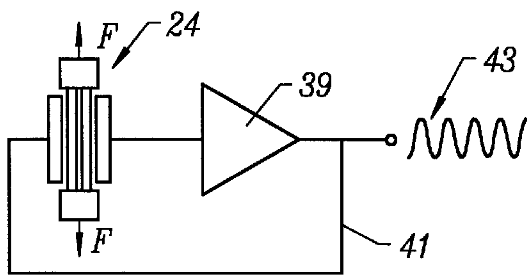
FIG. 7 illustrates the circuit of FIG. 6 generating a frequency shifted output signal in response to an acceleration force.

FIG. 6 illustrates a tuning fork 24 connected to an amplifier 39 and a feedback path 41. A force or a strain applied along the axis of the tines 29 causes the natural frequency of the structure to change. The change in tension results in a change in stiffness, shifting the frequency. To detect the frequency shift, the resonator is attached to sensing circuitry. In this example, the sensing circuitry is implemented with an amplifier 39, which generates an output signal 43. The output signal 43 is also applied as a feedback signal on line 41. The circuit of FIG. 6 is configured to be inherently unstable. The system is designed so that the frequency of instability is set by the frequency response of the tuning fork 24. The result is that the oscillation loop is constantly producing a waveform at the natural frequency of the resonator 24. When the applied force is increased or decreased, as shown in FIG. 7, the output frequency changes as a result of the previously discussed effect on the fork 24. The frequency of the output waveform can be accurately measured by either analog methods, such as phased-locked loops, or digital methods, such as counting the zero-crossings of the output signal and comparing the count to a high-precision clock.

Figure 8:
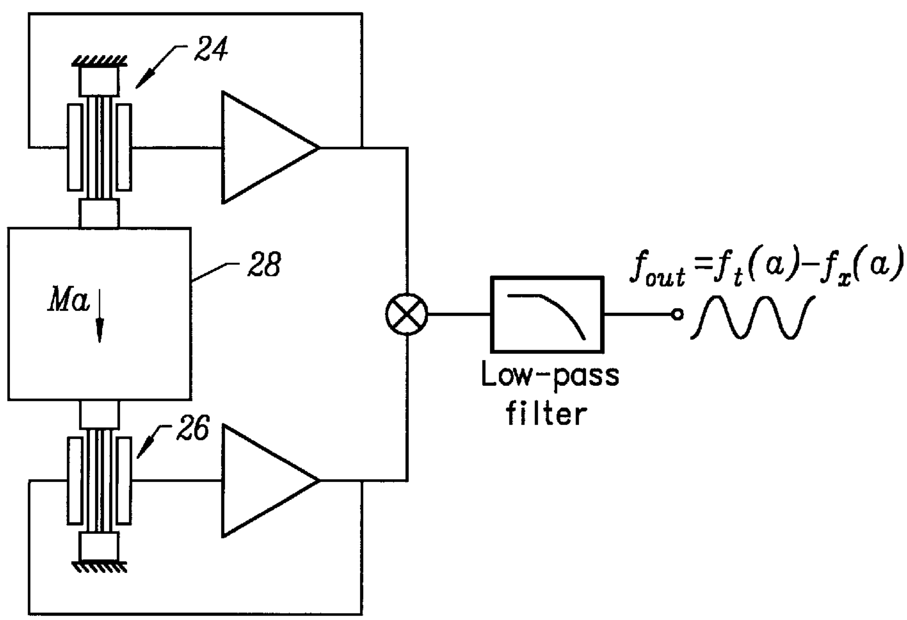
FIG. 8 is a schematic corresponding to the system of FIG. 1.

FIG. 8 illustrates a model of the system of FIG. 1. As shown in the figure, the device uses the frequency difference between two matched resonant forks 24 and 26 as the output. An acceleration causes one tuning fork to experience a tensile force, and the other a compressive force. This will raise one frequency and lower the other, providing an output to the sensor.

Figure 9:
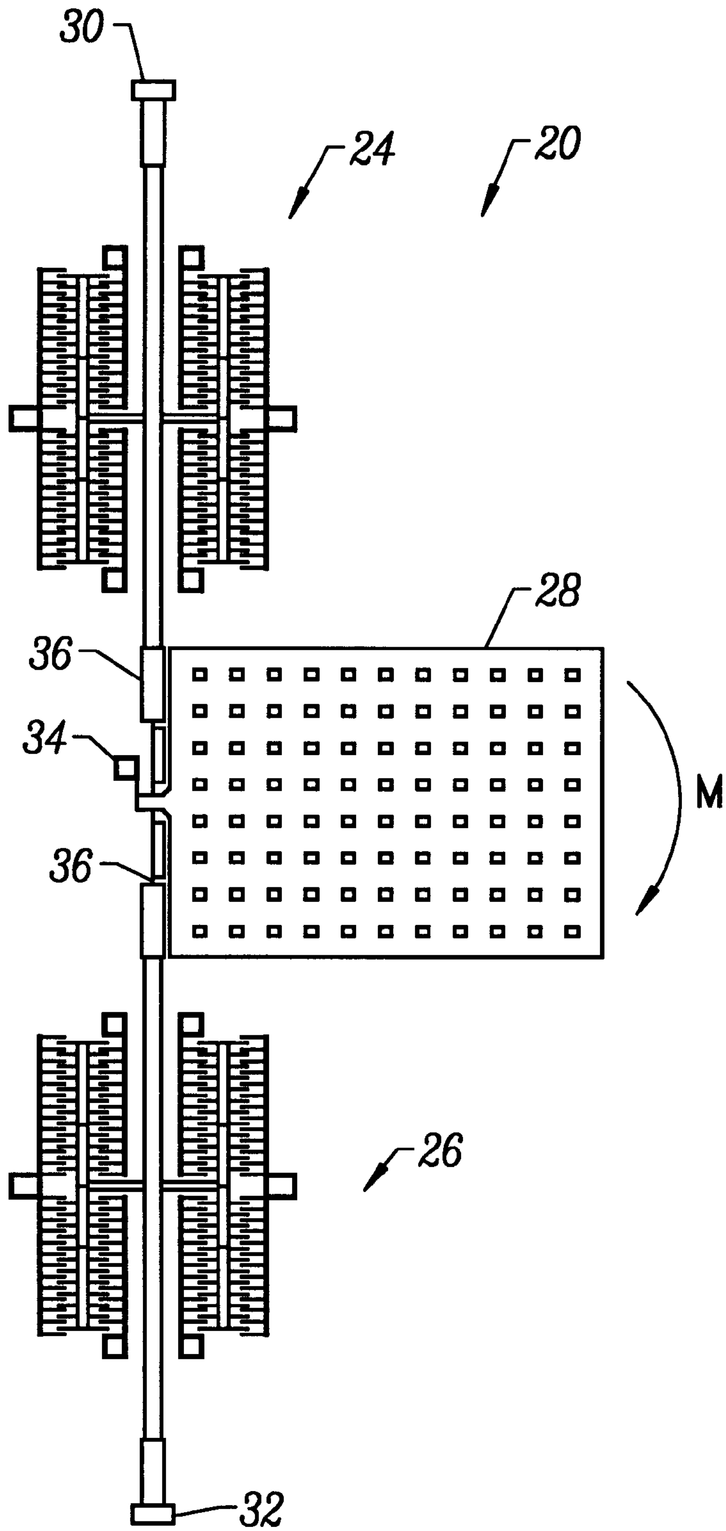
FIG. 9 is a plan view of a flexural lever resonant accelerometer in accordance with another embodiment of the invention.

FIG. 9 illustrates another embodiment of the invention. The embodiment of FIG. 9 has only a single flexural lever pivot 34 and lever arm 36, but otherwise operates on the same principle, with the single lever arm 36 distributing force from the proof mass 28 to the first tuning fork 24 and the second tuning fork 26, with the effect previously described.

In summary, the flexural lever resonant accelerometer 20 includes a leverage system that provides a connection between a proof mass 28 and a pair of tuning forks 24, 26. When an acceleration force is applied along the sensitive axis 22, the inertial force of the proof mass 28 is magnified by the leverage system and is applied to the resonating tuning forks. One of the forks is subject to a tensile force which raises its natural frequency. The other experiences a compressive force, lowering its frequency.

The frequency difference between the two forks 24, 26 is the output of the device 20. This push-pull configuration gives the device a first-order temperature compensation.

The invention's novel leverage system provides force amplification that increases the sensitivity of the sensor by an order of magnitude. Considering the extremely small inertial forces involved, this magnification is essential to achieve a reasonable minimum detectable signal in technologies where the available proof mass is minimal.

Figure 10:
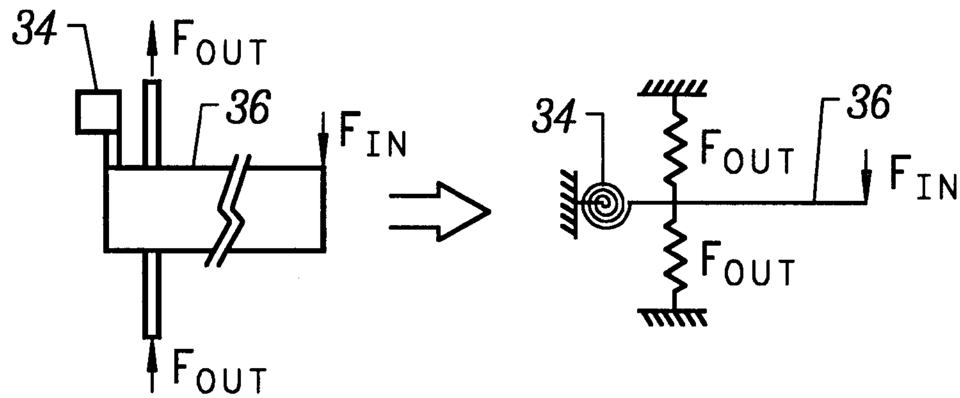
FIG. 10 illustrates the input and output forces associated with a flexural lever resonant accelerometer of the invention.

In order to maximize the scale factor available from the small inertial mass, the invention's leverage system is used to magnify the force applied to the tuning forks. The flexural lever pivots 34, 38 and proof mass 28 approximate a fulcrum and lever. FIG. 10 illustrates the input and output forces associated with the device of the invention. In particular, the figure schematically shows a lever pivot 34 and a lever arm 36.

The leverage system of the invention magnifies the force applied to the tuning forks by approximately an order of magnitude. The scale factor of the sensor is magnified by the same amount. To compensate for any bending moments applied to the tuning forks, the beams linking the forks to the lever arm are dimensioned so that the average moment across each tuning fork is zero. This insures that the tuning fork tines are not differentially loaded.

Each of the tuning forks on the accelerometer structure has its own sustaining amplifier. In each case, the amplifier and tuning fork form an oscillation loop that generates an output waveform at the natural frequency of the tuning fork.

These oscillators must be as stable as possible in order to minimize the sensor noise floor.

Figure 11:
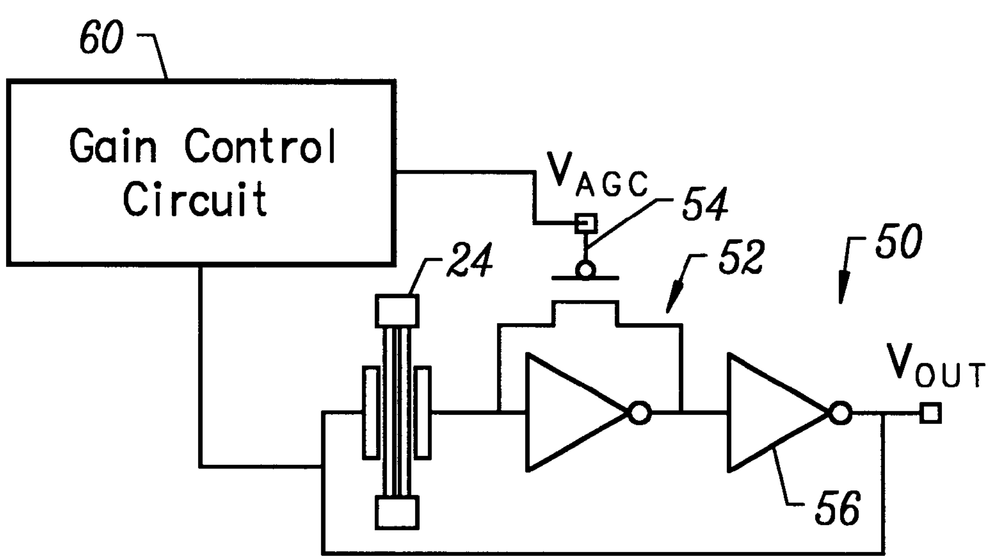
FIG. 11 is a schematic of an oscillation loop that may be used in accordance with an embodiment of the invention.

FIG. 11 illustrates an oscillation loop 50 that may be used in accordance with the invention. Each tine has drive and sense combs attached to it, and the two tines of each fork are driven and sensed in parallel. This arrangement rejects unwanted vibration modes and gives the resonator a series RLC electrical model similar to that of a quartz crystal. Near resonance, the reactive component of the impedance is small, and the fork has a primarily resistive behavior.

The electrostatic actuation is designed to mimic a single-degree-of-freedom linear resonator. The amplifier used to sustain each oscillation consists of a transimpedance stage 52, with a PMOS resistor 54 used to implement a variable gain, followed by a simple inverting stage 56. Current from the tuning fork 24 is fed back to the drive combs after being converted to a voltage by the amplifier. This positive feedback causes an oscillation to build. A gain control circuit 60 is used to limit the oscillation amplitude by reducing the gain of the transimpedance stage 52 as the oscillations increase.

The invention has been implemented with polysilicon 2 $\mu$m thick. The tuning fork tines have been implemented with sizes of approximately 120 $\mu$m×150 $\mu$m. The Analog Devices BiMEMS foundry process has been used to implement the device. Those skilled in the art will appreciate that any number of standard semiconductor processing techniques may be used to construct device in accordance with the invention.

The test results associated with the device have demonstrated improved performance over prior art devices. The device of FIG. 9 has been tested in vacuum in order to achieve a sufficiently high Q for oscillation. A bell jar constructed to allow a ceramic DIP package to be held at 150 mTorr by a roughing pump was used during testing. The feedthroughs of this bell jar were attached to a circuit board, and the board and jar were bolted together. This allowed gravitational acceleration to be applied to the chip while in vacuum. For higher forces, the test electrodes at either side of the proof mass were used to apply electrostatic forces.

Figure 12:
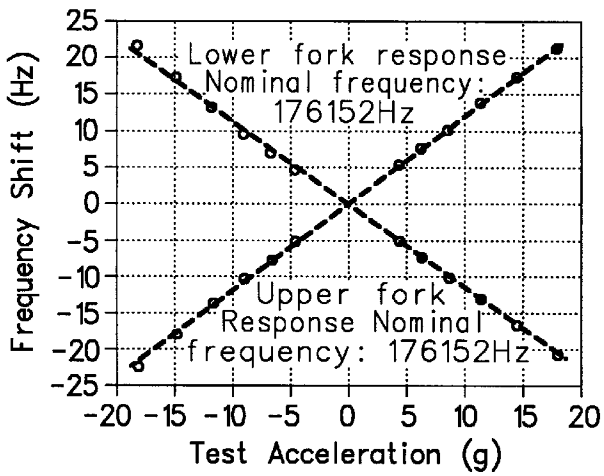
FIG. 12 is a plot illustrating the mechanical response of a device constructed in accordance with an embodiment of the invention.

The response of the individual tuning forks to these applied forces is shown in FIG. 12. The nominal frequencies of the forks are 174.9 and 176.1 kHz, a mismatch of 0.7%. The scale factor as measured with a ±g test is 2.4 Hz/g. As can be seen, the response of each fork is in line with expectations, and the sensitivities of the two forks are well-matched, despite the asymmetry of the sensor design of FIG. 9.

In order to characterize the oscillators, the two outputs were multiplied against each other, the high-frequency component was removed, and the resulting frequency difference was analyzed. The noise contributions from each fork were assumed to be equal, an assumption borne out by comparison of the two power spectra. This analysis method allowed the measurement of small fractional fluctuations without need of an external reference. The Allan variance was chosen as a figure of merit based on its applicability to signal processing of resonant sensor outputs.

Figure 13:
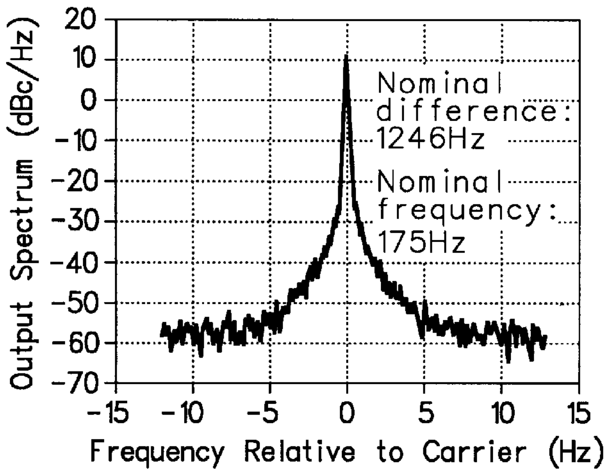
FIG. 13 is a plot of the output power spectrum of a device constructed in accordance with an embodiment of the invention.
Figure 14:
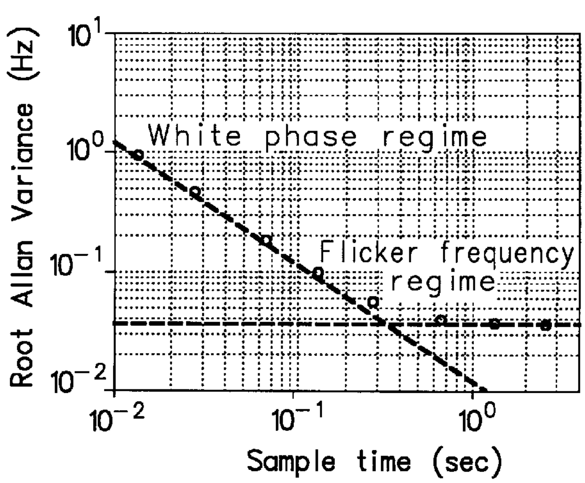
FIG. 14 is a plot illustrating the frequency stability of an oscillator constructed in accordance with an embodiment of the invention.

The frequency difference power spectrum and single-oscillator Allan variance data are shown in FIGS. 13 and 14, respectively. For an oscillation amplitude such that the noise floor is 58 db/Hz below the carrier, the constant region of the root Allan variance, or "frequency flicker floor", occurs at 38 mHz (220 ppb). Using model fitting techniques, the Q of open-loop forks on the same chip was estimated at 72,000.

Much better noise performance can be expected from oscillators based on these high-Q elements. There are two major sources of noise present in this system, one linear and one non-linear. The dominant linear noise source is the PMOS resistor in the sustaining amplifier. This resistor, located at the front end of the circuit, generates a large amount of current noise and gives the oscillation loop a very high noise floor. The effect at low oscillation amplitudes is to bury the signal in white noise, making it hard to detect and difficult to limit to linear regimes of operation. If the noise due to this source demands that the oscillation be at a nonlinear amplitude, the oscillator will never be very stable. In addition, this noise source is responsible for the 1/Γ portion of the root Allan variance graph, demonstrating that white noise hinders frequency measurements at high rates. An improved front end of this circuit based on Pierce configuration should reduce this noise source by at least an order of magnitude.

The second noise source in this system is nonlinear and is the dominant noise source at lower sampling frequencies. This source has been shown to be nonlinear mixing of the 1/f noise of the sustaining amplifier around the carrier signal. This mixing takes place when low-frequency drift in the sustaining circuits causes a series resistance drift in the tuning fork itself. Because the resonator is not vibrating in a truly linear regime, some amplitude-frequency effect remains. The resistance shift interacts with the gain control circuitry to produce an amplitude shift and along with it, a change in frequency. This noise source is responsible for the flicker floor, beyond which further time-averaging produces no decrease in frequency fluctuation. It can be minimized by reducing the amplitude of vibration to reduce the nonlinearity, by reducing the 1/f noise of the circuitry, or by an integrated AC-coupling scheme to remove the low-frequency drift from the tuning fork drive comb.

The two primary factors affecting the noise floor of a resonant sensor are the scale factor of the device and stability of its oscillators. In order to reduce the noise problems, the device of the invention has been fabricated in the integrated surface-micromachining process at Sandia National Labs. The resultant device has polysilicon that is 2$\mu$ thick, the tuning forks are 2 $\mu$m×180 $\mu$m, and the proof mass is approximately 460 $\mu$m×540 $\mu$m. The low-stress-gradient polysilicon allows a larger proof mass, and the leverage system provides greater magnification, both of which increase the scale factor. Making the leverage system symmetric (as with the embodiment of FIG. 1) removes any potential sensitivity to angular accelerations and improves the overall robustness of the device. It also removes the necessity of designing the tuning fork against transferred moments.

The invention has been described as being advantageous because it exploits the benefits of surface-micromachining technologies. However, the structure of the invention can also be constructed using laminar technology, such as single-crystal silicon, epi-polysilicon, silicon-on-glass, plated metal, or quartz.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. For example, multi-axis resonant accelerometers may be formed in connection with the teachings of the invention. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. An accelerometer, comprising:

a semiconductor substrate defining a semiconductor substrate plane;

a proof mass formed in a proof mass plane above and parallel to said semiconductor substrate plane;

a first resonant tuning fork connected to said proof mass, said first resonant tuning fork being formed on said semiconductor substrate;

a second resonant tuning fork connected to said proof mass, said second resonant tuning fork being formed on said semiconductor substrate; and a flexural lever leverage system supporting said proof mass above said semiconductor substrate, said flexural lever leverage system enhancing an acceleration force applied to said proof mass to cause a tensile force in said first resonant tuning fork which raises the resonant frequency of said first resonant tuning fork, and a compressive force in said second resonant tuning fork which lowers the resonant frequency of said second resonant tuning fork.

2. The accelerometer of claim 1 wherein said flexural lever leverage system includes a first flexural lever pivot and a second flexural lever pivot to support said proof mass above said semiconductor substrate.

3. The accelerometer of claim 2 wherein said flexural lever leverage system includes a first flexural lever arm connected to said first flexural lever pivot and a second flexural lever arm connected to said second flexural lever pivot; said first flexural lever arm flexing with respect to said first flexural lever pivot and said second flexural lever arm flexing with respect to said second flexural lever pivot in response to said acceleration force to enhance the force of said proof mass on said first resonant tuning fork and said second resonant tuning fork.

4. The accelerometer of claim 1 wherein said semiconductor substrate is silicon.

5. The accelerometer of claim 1 wherein said proof mass is polysilicon.

6. An accelerometer, comprising:

a semiconductor substrate;

a proof mass positioned above said semiconductor substrate;

a flexural lever pivot formed in said semiconductor substrate and connected to said proof mass;

a first tuning fork;

a second tuning fork; and a lever arm connected between said first tuning fork and said flexural lever pivot, and between said second tuning fork and said flexural lever pivot, wherein an acceleration force causes said proof mass to drive said lever arm with respect to said flexural lever pivot and thereby apply a tensile force to said first tuning fork and a compressive force to said second tuning fork.

7. The accelerometer of claim 6 wherein said semiconductor substrate is silicon.

8. The accelerometer of claim 6 wherein said proof mass is polysilicon.

9. An accelerometer, comprising:

a first tuning fork;

a first flexural lever pivot;

a first lever arm connected to said first flexural lever pivot and said first tuning fork such that said first lever arm flexes about said first flexural lever pivot in the presence of an acceleration force and thereby applies a tensile force to said first tuning fork;

a second tuning fork;

a second flexural lever pivot;

a second lever arm connected to said second flexural lever pivot and said second tuning fork such that said second lever arm flexes about said second flexural lever pivot in the presence of said acceleration force and thereby applies a compressive force to said second tuning fork; and a proof mass connected to said first lever arm and said second lever arm to enhance said acceleration force.

10. The accelerometer of claim 9 wherein said first flexural lever pivot and said second flexural lever pivot are formed as protrusions on a semiconductor substrate and operate to support said proof mass above said semiconductor substrate.

11. The accelerometer of claim 9 wherein said proof mass is formed of polysilicon.

* * * * *